United States Patent
Richter et al.

(10) Patent No.: US 6,725,279 B1
(45) Date of Patent: Apr. 20, 2004

(54) MULTIMEDIA PROCESSING SYSTEM ARCHITECTURE

(75) Inventors: Gerard Richter, Saint Jeannet (FR); Jean-Yves Solves, Marietta, GA (US)

(73) Assignee: Avaya Technology Corp., Basking Ridge, NJ (US)

( * ) Notice: Subject to any disclaimer, the term of this patent is extended or adjusted under 35 U.S.C. 154(b) by 176 days.

(21) Appl. No.: 09/604,929

(22) Filed: Jun. 28, 2000

(30) Foreign Application Priority Data

Jun. 28, 1999 (EP) ............................................. 99460045
May 19, 2000 (EP) ............................................. 00304248

(51) Int. Cl.$^7$ ............................................. G06F 15/163
(52) U.S. Cl. ....................................... 709/313; 105/231
(58) Field of Search ................................. 709/313, 231

(56) References Cited

U.S. PATENT DOCUMENTS 5,668,948 A * 9/1997 Belknap et al. ............. 709/231
5,751,883 A * 5/1998 Ottesen et al.
6,523,046 B2 * 2/2003 Liu et al.

FOREIGN PATENT DOCUMENTS

EP          0 398 644 A2    5/1990    ........... G06F/9/445
WO         WO 94/01824      1/1994    ........... G06F/15/21

OTHER PUBLICATIONS

Corboy Davit, Encapsulated Document and Format System, Dec. 3, 1998.*

Ikedo, T. et al, "Multimedia Processor Architecture" "Proc. IEEE International Conference on Multimedia Computing and Systems" Jun. 28, 1998–Jul. 1, 1998, pp. 316–325.

European Search Report Dated Dec. 20, 1999.

* cited by examiner

Primary Examiner—John Follansbee
Assistant Examiner—Lechi Truong
(74) Attorney, Agent, or Firm—David Volejnicek

(57) ABSTRACT

A multimedia processing system architecture performs a plurality of multimedia tasks on multimedia data using a plurality of multimedia processing blocks, at least one communication bus to carry the flow of multimedia data between the multimedia processing blocks. An application interface manages the multimedia processing blocks. For each multimedia task, the application interface creates a subset of multimedia processing blocks to be assembled in order to run the multimedia task. In this architecture, each multimedia processing block comprises at least one input interface to connect it in receive mode to a communication bus and/or at least one output interface to connect it in send mode to a communication bus. To create a subset of multimedia processing blocks, the application interface selects multimedia processing blocks to form the subset, and then examines the input and output interfaces of the selected multimedia processing blocks in order to check whether all the multimedia data exchanges to perform the multimedia task are possible within the subset and determine, for these exchanges, the encoding format of the multimedia data to be exchanged and the communication buses to be used to connect the different multimedia processing blocks of the subset in pairs according to the complementarity of the ports of their respective input interface and output interface.

6 Claims, 1 Drawing Sheet

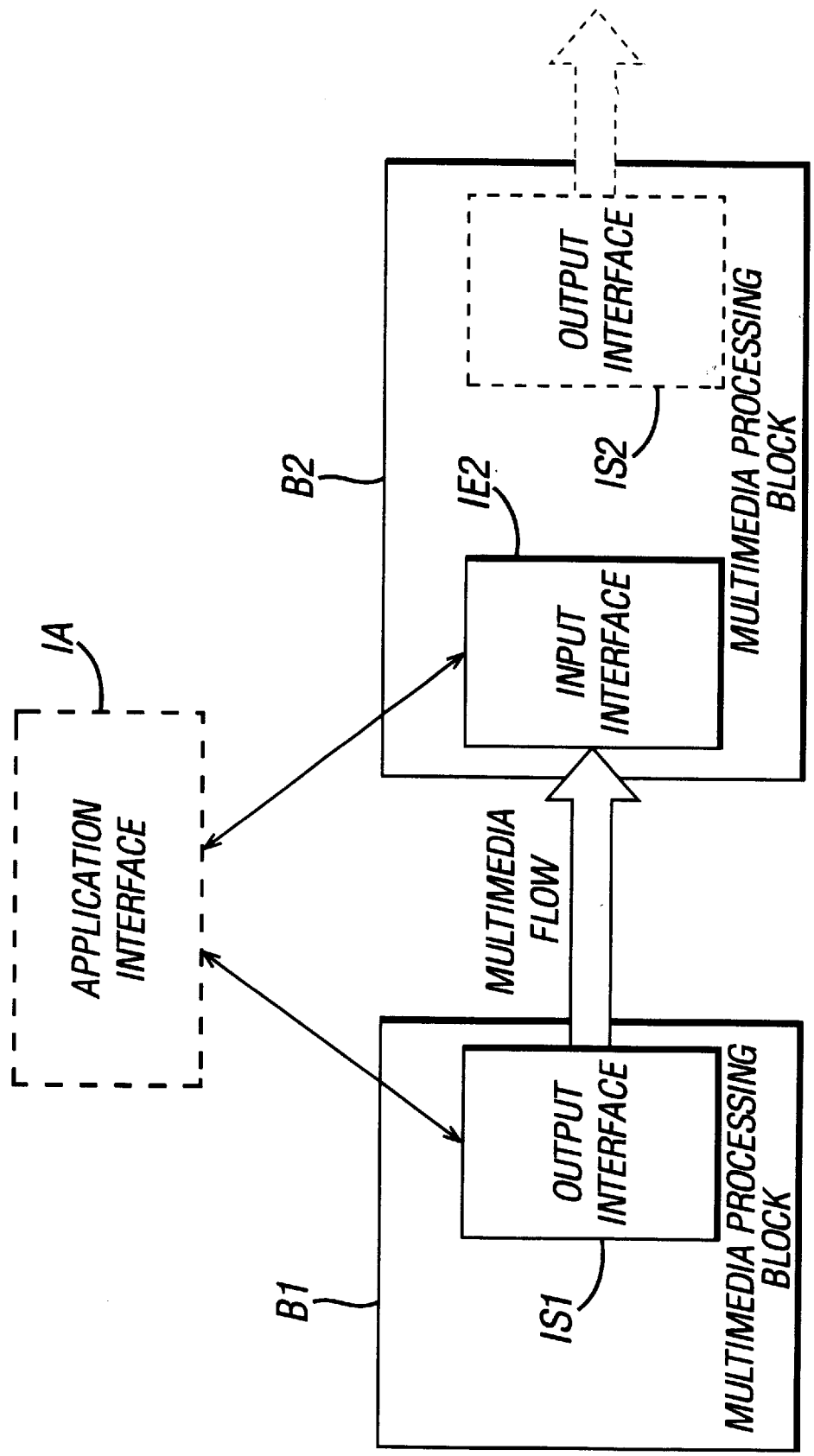

MULTIMEDIA PROCESSING SYSTEM ARCHITECTURE

CROSS-REFERENCE TO RELATED APPLICATION

This application claims priority of European Patent Application No. 99460045.0, which was filed on Jun. 28, 1999 and European Patent Application No. 00304248.8, which was filed on May 19, 2000.

TECHNICAL FIELD

The present invention relates to a multimedia processing system architecture.

BACKGROUND OF THE INVENTION

The appearance of multimedia communication has brought with it a number of systems capable of processing signals that vary from voice to text to images. These systems are, for example, voice mail systems, unified message systems, or interactive voice response systems. The invention will mainly be described using the example of a unified message system, given as a non-limiting example of an application of the invention.

Unified message systems are systems that record various types of messages, such as telephone, electronic, or fax messages, and that provide the recipient with the message either in its original form (voice, internet text, fax text, etc.) or in a different form. The services or multimedia tasks that such systems provide are very varied and, as an example, may include any of the following tasks:

1) recording telephone messages;
2) reviewing telephone messages;
3) reviewing electronic messages.

Running these multimedia tasks requires means for connecting to the telephone network and to the Internet in order to receive messages, more specific multimedia processing means to transform the messages, and communication buses to create contacts between these various means.

For example, in telephone message recording, the service requires means for connecting to the telephone network, and a recording device that compresses and saves the message in a storage unit of the system. The telephone message reviewing service requires means for connecting to the telephone network, and possibly a voice recognition device that enables the subscriber to communicate with the system in order to select the message the subscriber wants to hear. The system may require a DTMF detection device to detect the buttons that have been pressed by the user to select the message. The system may also require a reading device that reads the file for the selected message in the storage unit, decompresses the message, and creates a flow of multimedia data from the file to reproduce the telephone message. The electronic message reviewing service requires a voice synthesis device to transform the electronic messages into a voice, in addition to the means necessary for reviewing telephone messages.

At present, multimedia processing systems are constructed around a PCI, Compact PCI, VME, or similar standard bus. The systems include a specific TDM (time-division multiplexing) bus to carry multimedia data. This specific bus is optimized for carrying the voice at a throughput of 64 kbps.

The TDM transport is not suitable for multimedia applications, given the diversity of multimedia sequences to be carried, such as audio, video, etc., and the diversity of the data encoding formats of these sequences, there being a number of audio, video, or text encoding formats.

SUMMARY OF THE INVENTION

The invention provides a system architecture that is not limited to a single mode of transport and manages multimedia data transfers across a plurality of different buses and communication protocols, such as ATM, TDM, TCP, UDP, etc. As a result, the invention provides an upgradeable multimedia processing system that is capable of operating with many types of communication buses and that provides simple management of multimedia processing means and multimedia flows.

The invention relates to a multimedia processing system architecture intended to perform a plurality of multimedia tasks on multimedia data, comprising:

a plurality of multimedia processing blocks to run all or part of the operations required to perform a multimedia task, at least one communication bus to carry the multimedia data flows between said multimedia processing blocks, an application interface to manage said multimedia processing blocks, with said application interface being in charge of creating, for each multimedia task, a subset of multimedia processing blocks to be assembled to run said multimedia task, characterized in that each multimedia processing block contains at least one input interface to connect in receive mode to said at least one communication bus and/or at least one output interface to connect in send mode to at least one communication bus, with at least one of the input interfaces and one of the output interfaces comprising several ports to be connected to respective communication buses, and in that, to create a subset of multimedia processing blocks, the application interface selects multimedia processing blocks to form said set, and then examines the input and output interfaces of said multimedia processing blocks selected in order to check whether all the multimedia data exchanges required to perform the task are possible within said subset and determine, for these exchanges, the encoding format of the multimedia data to be exchanged and the communication buses to be used to connect the different multimedia processing blocks of said subset in pairs according to the complementarity of the ports of their respective input and output interface.

In the event of exchange being impossible after the input and output interfaces of the selected subset have been examined, the application interface modifies the selection of the multimedia processing blocks.

This type of architecture enables an identical application interface to be used irrespective of the number or the type of communication buses used in the system.

Other advantages and characteristics of the invention will become clear in the following detailed description.

BRIEF DESCRIPTION OF THE DRAWING

The description refers to the single FIGURE that shows a drawing of the operating principle of the multimedia processing system of the invention.

DETAILED DESCRIPTION

Referring to the single FIGURE, the multimedia processing system comprises an application interface IA wherein the multimedia tasks (or services) that are run by the system are defined. The system also comprises one or more communication buses (not shown in the figure) that carry multimedia data through the system.

The system in this FIGURE also comprises two multimedia processing blocks B1 and B2 to run a multimedia task. The blocks are declared to the application interface IA when they are incorporated in the system.

Each multimedia processing block of the system comprises an output interface to connect it in send mode to one of the system communication buses and/or an input interface to connect it in receive mode to one of the system communication buses. In the example shown in the single figure, block B1 comprises an output interface IS1 and block B2 comprises an input interface IE2 and an output interface IS2.

For each multimedia task, application interface IA creates a subset of the multimedia processing blocks required to run said task. In order to create these subsets, the application interface must know the capacity of each of the multimedia processing blocks to be connected in send mode or receive mode to the various communication buses in the system. It is for this reason that when the subset is created, application interface IA selects a first subset of blocks and then examines the input and output interfaces of the selected blocks to check whether all of the exchanges relative to the task to be run are possible. For example, to determine whether or not a multimedia flow may be created between block B1 and block B2, the application interface examines the connecting ports of output interface IS1 of block 1 and those of the input interface of block B2. Data exchanges are possible provided that these two interfaces have ports enabling them to be connected to a common communication network. If both blocks can access several common communication buses, application interface IA chooses the most suitable network according to the nature of the multimedia data.

When the output and input interfaces of the two blocks that are to communicate with each other are examined, the application interface also checks that these two interfaces are respectively capable of sending and receiving multimedia data with the same encoding format.

The interface examination is illustrated by the following example. Consider a multimedia processing system that comprises an ATM network, a UDP network and a TDM bus. In order to monitor electronic messages, the system also comprises, for example, a voice synthesis device to transcribe voice into written messages, and a connecting device to the telephone network to enable the receiver of these messages to listen to them via a telephone. The output interface of the voice synthesis device comprises a connecting port to the ATM bus and a connecting port to the TDM bus. Furthermore, this interface can send multimedia data encoded in G711 A-law or G711 $\mu$-law format.

The input interface of the connecting device to the telephone network also comprises a connecting port to the TDM bus and another to the UDP bus, and it is capable of processing data that is encoded in G711 $\mu$-law or G728 format.

|  | Voice synthesis device | Connecting device to the telephone network |
|---|---|---|
| Possible modes of transport | TDM ATM | TDM UDP |
| Possible encoding formats | G711 A-law G711 $\mu$-law | G711 $\mu$-law G728 |

The application interface examines whether or not a multimedia data flow can be created between these two blocks when a subset requiring these two processing blocks is created. In the present example, the two blocks can communicate via the TDM bus using the G711 $\mu$-law format. The application interface then validates the two blocks in the subset and their use (use of the TDM bus and the G711 $\mu$-law format).

In the event of exchange being impossible, once the interfaces have been examined, the application interface modifies the composition of the subset in order to obtain the exchanges required to run the multimedia task. The modification of the subset may consist in adding an encoding/decoding block when the encoding format is incompatible. In order for the block to be incorporated in the subset, it must, clearly, be included in the system.

In one version, a system could be envisaged wherein the application interface IA only orders the processing blocks of the subset to connect together. All the system intelligence would then be concentrated on the processing blocks.

Then, when the multimedia task is performed, the application interface selects the subset blocks by turns, and controls the multimedia flows between the blocks by selecting the connecting ports and the encoding formats that were chosen when the subset was created.

This type of architecture eliminates having to define the connections between the blocks for each multimedia task beforehand, and enables a more flexible system to be obtained. This architecture is particularly used to implement very complex multimedia processing configurations using, for example, echo suppressors or encoding or decoding blocks with a very simple application interface.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. Multimedia processing system architecture for performing a plurality of multimedia tasks on multimedia data, comprising
   a plurality of multimedia processing blocks to run part or all of operations required to perform a multimedia task,
   at least one communication bus to carry multimedia data flows between said multimedia processing blocks,
   an application interface to manage said multimedia processing blocks, with said application interface being in charge of creating, for each multimedia task, a subset of multimedia processing blocks to be assembled to run said multimedia task,
   characterised in that each multimedia processing block contains at least one input interface to connect in receive mode to said at least one communication bus, and/or at least one output interface to connect in send mode to said at least one communication bus, with at least one of the input interfaces and one of the output interfaces comprising several ports to be connected to respective communication buses,
   and in that, to create the subset of multimedia processing blocks, the application interface selects multimedia processing blocks to form said subset, and then examines the input and output interfaces of said multimedia processing blocks selected in order to check whether all multimedia data exchanges to perform the corresponding multimedia task are possible within said subset and determine, for these exchanges, an encoding format of the multimedia data to be exchanged and the communication buses to be used to connect the different multimedia processing blocks of said subset two by two according to complementarity of the ports of their respective input and output interface.

2. Architecture according to claim 1, characterised in that, if the exchanges are found to be impossible at an end of the examination of the input and output interfaces of the selected subset, the application interface modifies said multimedia processing block selection.

3. A multimedia processing system for performing a plurality of multimedia tasks on multimedia data, comprising:

at least one communication bus to carry multimedia data flows between multimedia processing blocks;

a plurality of said multimedia processing blocks to run part or all of operations required to perform a multimedia task, each multimedia processing block containing at least one input interface to connect in receive mode to said at least one communication bus, and/or at least one output interface to connect in send mode to said at least one communication bus, with at least one of the input interfaces and one of the output interfaces comprising several ports to be connected to respective communication buses; and an application interface to manage said multimedia processing blocks, with said application interface selecting for each multimedia task a subset of the multimedia processing blocks to be assembled to run said multimedia task, and examining the input and output interfaces of said selected multimedia processing blocks to check whether all multimedia data exchanges to perform the corresponding multimedia task are possible within said subset and determine, for these exchanges, an encoding format of the multimedia data to be exchanged and the communication buses to be used to connect the different multimedia processing blocks of said subset two-by-two according to complementarity of the ports of their respective input and output interface.

4. The system of claim 3 wherein:
   the application interface modifies said multimedia processing block selection if the exchanges are found to be impossible upon the examination of the input and output interfaces of the selected subset.

5. A method for performing a plurality of multimedia tasks on multimedia data in a multimedia processing system comprising at least one communication bus to carry multimedia data flows between said multimedia processing blocks, a plurality of the multimedia processing blocks to run part or all of operations required to perform a multimedia task, each multimedia processing block containing at least one input interface to connect in receive mode to said at least one communication bus, and/or at least one output interface to connect in send mode to said at least one communication bus, with at least one of the input interfaces and one of the output interfaces comprising several ports to be connected to respective communication buses, and an application interface to manage said multimedia processing blocks, the method comprising:

the application interface selecting for each multimedia task a subset of the multimedia processing blocks to be assembled to run said multimedia task;

the application interface examining the input and output interfaces of said selected multimedia processing blocks to check whether all multimedia data exchanges to perform the corresponding multimedia task are possible within said subset; and the application interface determining, for these exchanges, an encoding format of the multimedia data to be exchanged and the communication buses to be used to connect the different multimedia processing blocks of said subset two-by-two according to complementarity of the ports of their respective input and output interface.

6. The method of claim 5 further comprising
   the application interface modifying said multimedia processing block selection, if the exchanges are found to be impossible upon the examination of the input and output interfaces of the selected subset.

* * * * *